Figure 1:
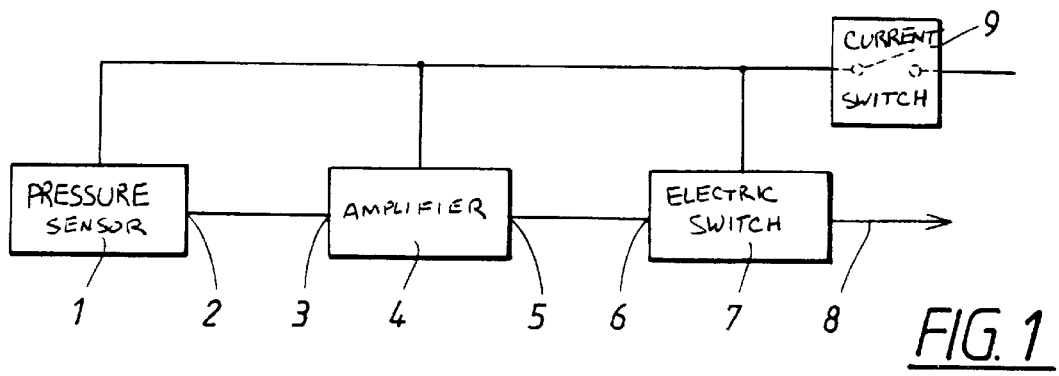

United States Patent [19]
Harde

[11] Patent Number: 6,041,644
[45] Date of Patent: Mar. 28, 2000

[54] DEVICE FOR DETECTION OF A DEFINED RELATIVE POSITION

[75] Inventor: Bo Harde, Göteborg, Sweden

[73] Assignee: AB Volvo, Sweden

[21] Appl. No.: 09/084,711

[22] Filed: May 26, 1998

[30] Foreign Application Priority Data

Aug. 25, 1997 [SE] Sweden .................................. 9703047

[51] Int. Cl.[7] .................................................. G01M 3/02
[52] U.S. Cl. .............................................. 73/37; 340/687
[58] Field of Search ............................ 73/37, 724.2, 730, 73/731; 340/457, 568, 687, 626, 665, 666, 573.4, 940; 200/61.62, 81 R, 81.4

[56] References Cited

U.S. PATENT DOCUMENTS

| | | | |
|---|---|---|---|
| 2,019,393 | 10/1935 | Carah . | |
| 4,020,482 | 4/1977 | Feldl ........................................ 340/626 |
| 4,307,456 | 12/1981 | Ise et al. ................................. 367/107 |
| 4,336,533 | 6/1982 | Wettach .................................. 340/666 |

*Primary Examiner*—Michael Brock
*Attorney, Agent, or Firm*—Lerner, David, Littenberg, Krumholz & Mentlik, LLP

[57] ABSTRACT

A device for detection of a defined relative position of a first, movable means, relatively a second, fixed means and including a sensor (1) arranged at least at one of the first and second means which sensor is provided with a pressure sensing means ($CC_M$). The sensor (1) gives rise to an electric detector signal, which indicates whether the defined relative position has been taken. The sensor (1) is also provided with a closed cavity (13) which communicates with a pressure sensing means ($C_M$) and with means (14/36/45) to momentarily limit the volume of the cavity and thereby create a pressure pulse adapted to activate the pressure sensing means of the sensor. The detector device includes means to convert the pressure pulse to a detection signal to detect the defined relative position.

7 Claims, 5 Drawing Sheets

DEVICE FOR DETECTION OF A DEFINED RELATIVE POSITION

TECHNICAL FIELD

The present invention refers to a device for detection of a defined relative position of a first, movable means, relatively a second, fixed means and including a sensor provided by a pressure sensing means which is arranged at least at one of said first or second means which sensor is adapted to generate an electric detector signal, which indicates whether the defined relative position has been taken.

STATE OF THE ART

Within several fields for various reasons there is a need to detect an exactly chosen relative position of a means, that is movable relatively a fixed means, for example to detect that a tank lid is completely tightened on a filling-up opening for fuel in a motor vehicle. The fact is, that in certain countries to an ever increasing extent environmental demands are made concerning closing of fuel systems for motor vehicles.

For example, an incompletely tightened tank lid can cause discharge of fuel gases and even leakage of fluid. With respect to fire hazard it is important that the tank lid is completely tightened to the filling-up opening.

Through GB-A-2 283 233 there is previously known a detection system which detects that a tank lid is completely tightened such, that the filling-up opening is completely sealed versus the environment. The known system includes a pressure sensor in the tank lid which senses the pressure change that occurs in the filling-up pipe when the tank lid closes the opening. There is a reason to assume that there are difficulties in calibrating a detection device of this type, since the pressure conditions can vary between different vehicles and even within the same vehicle and when the pressure change is relatively small.

SUMMARY OF THE INVENTION

The object of the invention is to develop a detection device that simply and with large exactness is able detect the relative position of a first means relatively a second means.

The object is attained by means of a device according to the invention which is characterized therein that said sensor is provided with a closed cavity which communicates with the pressure sensing means and with means to momentarily limit the volume of the cavity and thereby create a pressure pulse adapted to activate the pressure sensing means of the sensor and that the detector device includes means for converting said pressure pulse to a detection signal for detection of said defined relative position.

SPECIFICATION OF DRAWINGS

Figure 6:
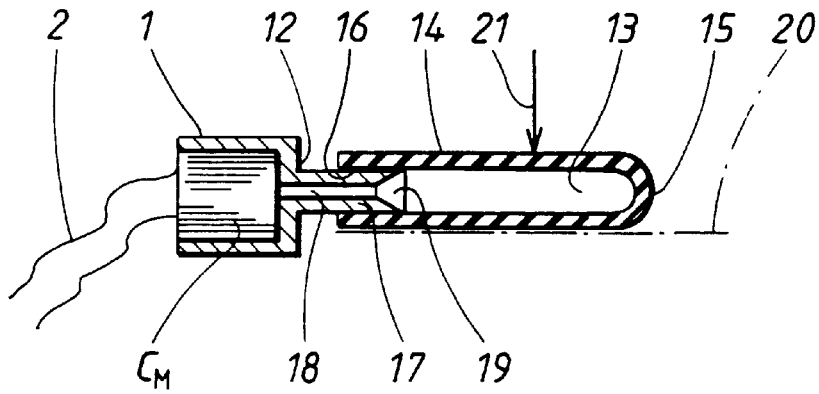
Figure 7:
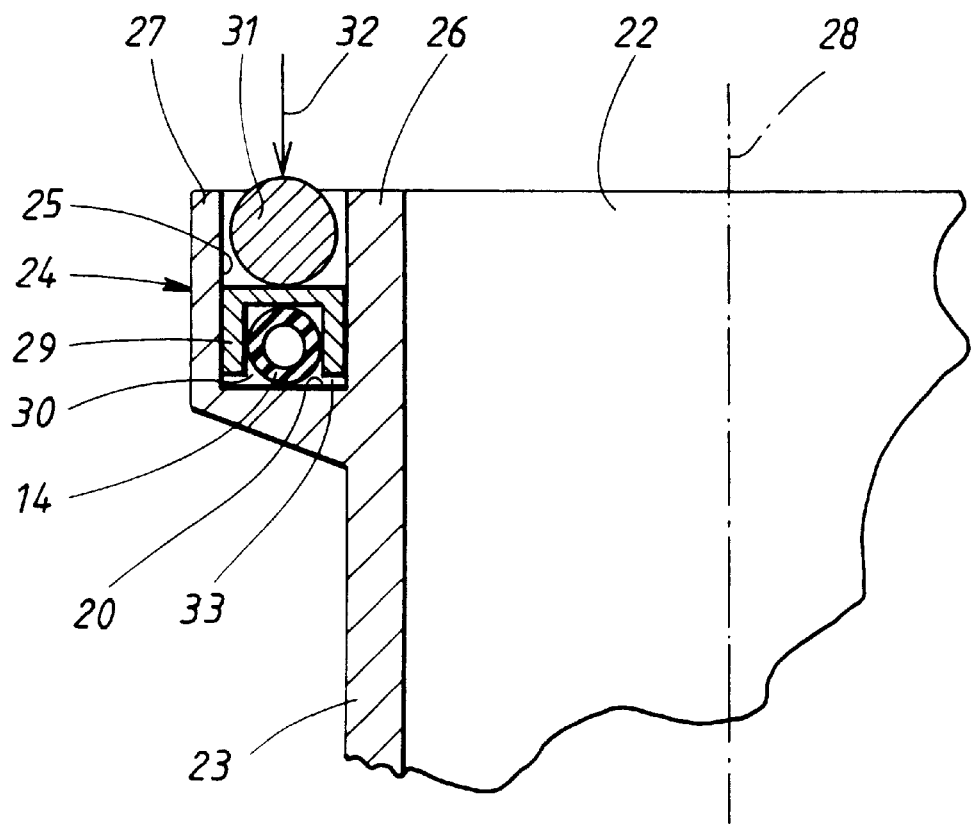
Figure 8:
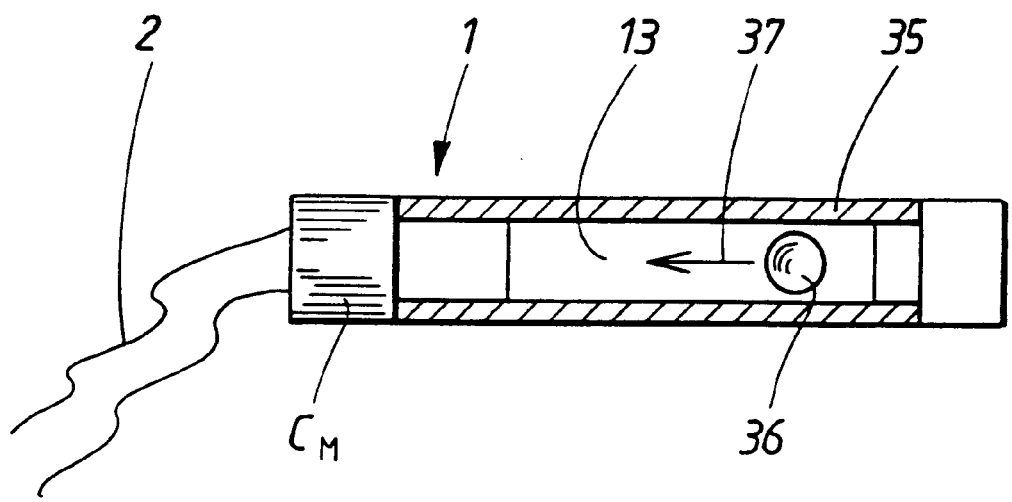
Figure 9:
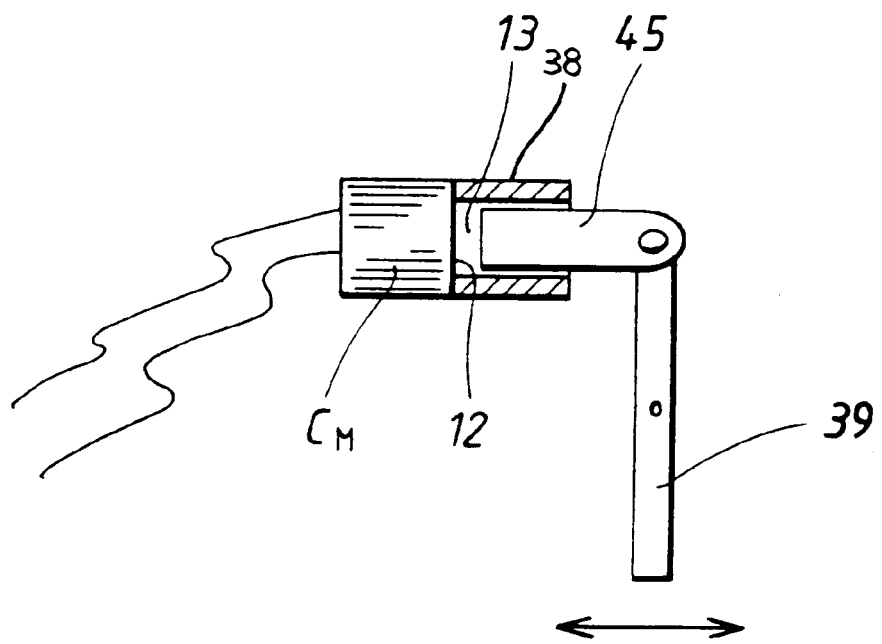
Figure 10:
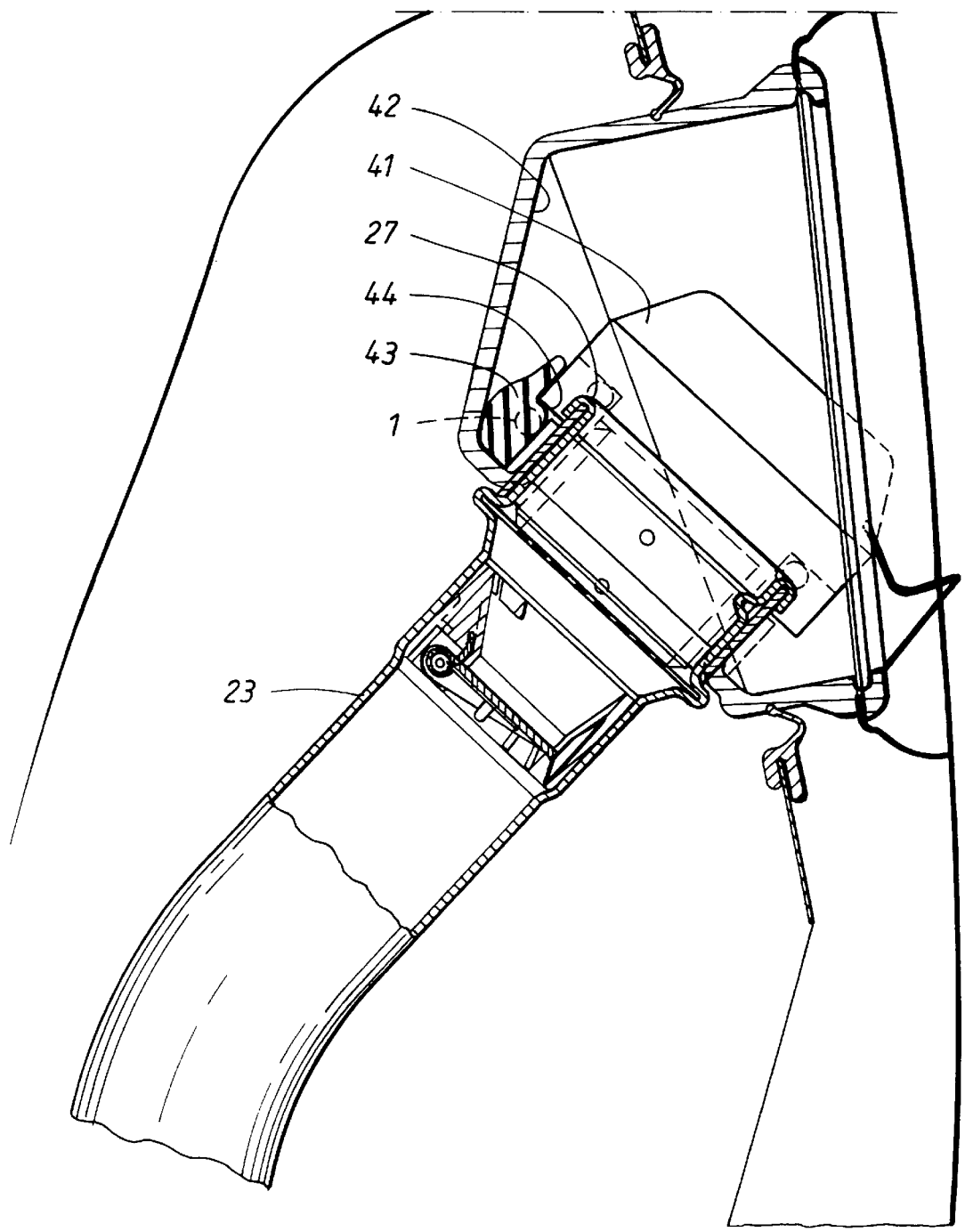

In the following the invention will be described in greater detail by means of some embodiments. In the drawings FIG. 1 is a block diagram that diagrammatically shows the principle of the invention, according to a first embodiment, FIGS. 2, 3, 4 and 5 shows examples of wiring diagrams of the detection device according to the invention, FIG. 6 shows an example of a sensor included in the detection device, FIG. 7 shows a partly broken sectional view of a portion of a filling-up pipe of a fuel system for a motor vehicle, in which the position of the sensor can be seen, FIGS. 8 and 9 shows two further embodiments of the sensor included in the detection device, FIG. 10 diagrammatically shows a filling-up pipe with a tank lid for a fuel system of a motor vehicle, which is provided with the detection device according to the invention.

PREFERRED EMBODIMENTS

As can be seen in the block diagram according to FIG. 1 the detection device consists of a pressure sensor 1, which preferably is constituted with a microphone, which is adapted such that it senses a pressure pulse that is generated in a defined relative position of a movable means relative to a fixed means, for example a tank lid relative to a filling-up opening of a fuel system of a motor vehicle, which will be described in greater detail below. The sensor 1 at an output 2 is adapted to emit an electric signal, for example in the form of a pulse to an input 3 of an amplifier 4 with preferably high current amplification. In the amplifier 4 an output signal 5 is generated, that is fed to an input 6 of an electric switch 7, such as a bistable flip-flop, for example with a thyristor as a switching element. This is adapted to emit an output signal at an output 8 that for example changes state between two voltage levels and forms an output signal from the detection device to indicate if the sensing of the defined position being taken or not has occured. A current switch unit 9 is also included in the detection device, which is adapted when the movable means is removed, to hold the detector device inactive by maintaining the voltage supply disconnected to the sensor 1, amplifier 4 and the switch 7, whereby unwanted detection is avoided.

The current switch 9 can be arranged such, that it by the first contact of the movable means with the fixed means is changed over to a closed position in order thereby to activate the remaining part of the detection device.

Figure 2:
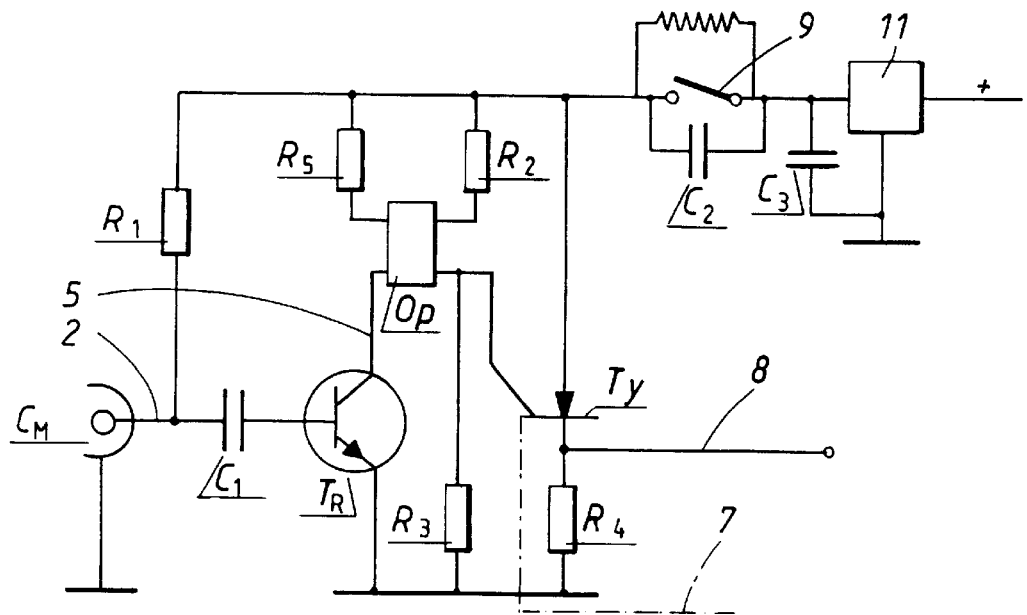

FIG. 2 in greater detail by means of an example of a wiring diagram shows the structure the detection device according to the invention. In the figure is shown a pressure sensing component provided in the sensor 1, preferably a microphone $C_M$, for example a condenser microphone, such as an electronic microphone. Thus, this by a pressure change through capacitance change at its output is intended to emit an electric current pulse to the amplifier 4, which includes a transistor stage $T_R$. This stage has a very high current amplification and preferably consists of a darlington circuit adapted to conduct at a short interval and at the output 5 of the amplifier emit a short, amplified current pulse, that activates an opto coupler $O_P$. This in its turn is adapted to change over the switch 7, which in the example shown is constituted by a thyristor $T_y$ which is triggered by said current pulse to conduct and thereby create a voltage change on the output 8 which also constitutes the detector output for indication of said defined position. In the circuit is also shown a current switch 9 and a power supply 11 as well as resistors $R_1$–$R_5$ and capacitors $C_1$–$C_3$ for correct voltage levels, noise suppression and adjustment of the sensitivity of detector respectively. The transistor stage $T_R$ may alternatively consist of two separate transistors, which together give high current amplification.

Figure 3:
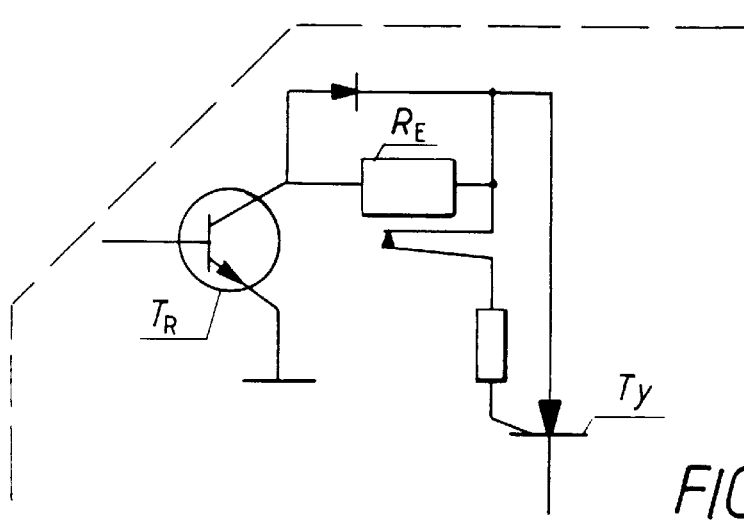

FIG. 3 shows a variant of a part of the wiring diagram according to FIG. 3 (2) where the opto coupler $O_P$ is substituted by a reed relay $R_E$, which in an analogous manner connects the trigger circuit to the thyristor $T_y$.

Figure 4:
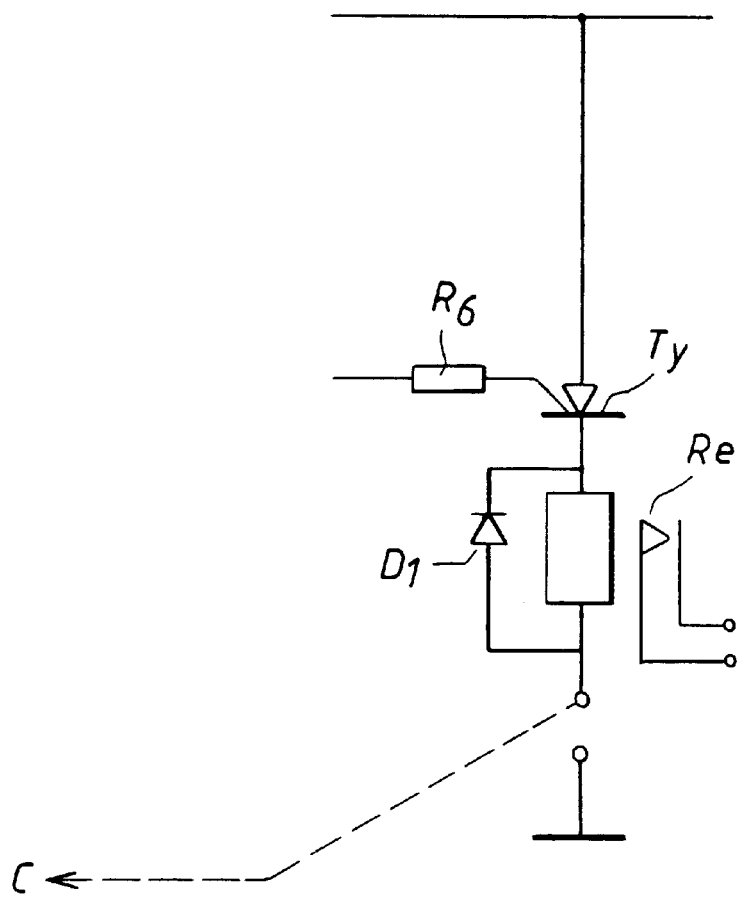
Figure 5:
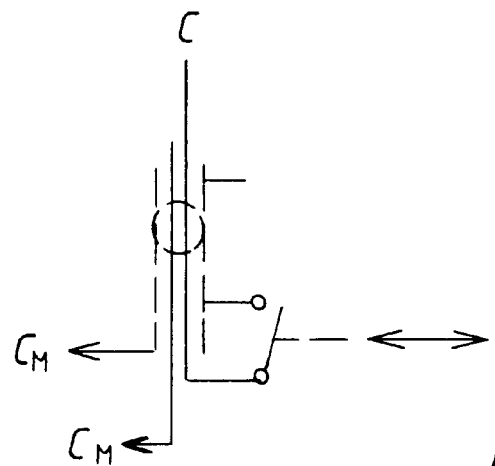

FIGS. 4 and 5 show a variant of a part of the wiring diagram according to FIG. 3, namely the electric switch 7 and the current switch 9. In principle the sensor and the amplifier may correspond to that shown and described above with reference to FIG. 2, whereby the input of the thyristor $T_y$ in FIG. 4 is connected to the opto coupler $O_P$ in FIG. 2. In this variant the electric current switch unit 9 is connected in series with the thyristor $T_y$ and is adapted to be closed before the sensor $C_M$ is activated and thereby turns on the thyristor $T_y$. The diode $D_1$ across the relay coil Re absorbs the pulse that occurs at turn off. By arranging the current switch 9 in series with the thyristor $T_y$ and make the current switch close before the thyristor begins to conduct, there is no risk of a spark that may cause a fire hazard. In this case the sensor $C_M$ may operate as a simple detector of the sound click that is generated by tightening of the lid.

FIG. 6 shows an example of the physical structural design of the sensor 1. This besides of the microphone CM with electric output connections and a pressure sensing sensor plate 12, facing a closed accommodation or a cavity 13 consists of a closed, elastic container 14. This for example consists of an airtight rubber container, diagrammaticaly shown in section, but can be mainly tubular (see FIG. 6) with a closed end 15 and an opening 16, that is thread on a sleeve 17, which in an airtight manner surrounds the microphone or at least its sensor plate 12. In the example shown an air duct 18 is provided between the container 14 and the sensor plate 12, which exhibits a funnel shaped intermediate part 19 between the cavity and the duct.

The sensor according to FIG. 6 is arranged such that the container 14 rests on a fixed support surface 20 which is schematically indicated by a dash-dot line and to be compressed in the direction of the arrow 21, when the movable means takes its defined relative position relative to fixed means which can be considered as represented by the support surface 20. At this position a pressure pulse is created in the cavity 13 by the volume reduction of the same, which through the smaller cross sectional area of the duct 18 than that of the cavity gives an amplified pressure pulse on the sensor plate 12. The pressure pulse is converted by the microphone to an electric pulse at the output of the sensor 2, which is amplified and signal processed in the above described manner.

FIG. 7 shows the application case with sensing of the correct closing position of a lid not shown in the figure relative to the opening 22 of a filling-up pipe 23. This exhibits a collar 24 with a ring-shaped groove 25, which runs round the opening 22 and divides the collar into an inner opening rim 26 and an external opening rim 27. In the groove there is provided a relatively rigid pressure part 29 which is axially movable, i.e. in the same direction as that of the length axis 28 of the filling-up pipe 23, which pressure part in the example shown has an U-shaped section and may extend ring-shaped in the groove 25 or only a limited part thereof. The pressure part 29 exhibits an accommodation 30, in which the sensor and more exactly the resilient container 14 is inserted. In the groove is further shown an O-ring seal 31, which is adapted to seal against a portion of the lid when it is applied in a correct position. In this respect the lid thus corresponds to the above said movable means, while the filling-up pipe 23 represents the fixed means. When the lid is applied in a correct and a completely tight position, which constitutes the above defined position, a force from a surface of the lid has been applied in the direction of the arrow 32 towards the sensor and more exactly the resilient container 14 via the elastic O-ring seal 31. Through pressing down of the same and thereby of the pressure part 29, which in a non-pressurized condition exhibits a space 33 to the bottom of the groove 25 which forms the support surface 20 the resilient container 14 is compressed. This gives the above described pressure pulse which via the other components of the detection device gives a detection that the defined position has been taken.

FIG. 8 shows an alternative example of structural design of the sensor 1. This also exhibits a cavity 13 which is made as a limited space, that connects to the sensor plate 12. However, the cavity is enclosed by an envelope 35, which is not necessarily resilient but can be made as a rigid sleeve. In this case the pressure pulse is created by a ball 36 which is dimensioned such that it on the whole closes the cavity 13, which has a circular cross sectional shape. The ball is allowed to roll in the direction of the arrow 37, when the defined position has been obtained. This is achieved by for example a mechanical action of the sensor 1 so that it for example tilts and thereby sets the ball in motion, whereby a pressure pulse is generated by the compression of the air that is obtained due to volume reduction in the space between the ball and the sensor plate 12.

FIG. 9 shows an additional example of structural design of the sensor 1, in which a piston 45 with good fit interjects in a sleeve 38 that connects to the microphone and together with the sensor plate 12 delimits a space 13, which is compressed through the motion of the piston in a direction towards the sensor plate. This motion can be achieved via for example a lever 39, which via a sensor part is brought to pivot in one of the directions of the double arrow 40 at applying for example the tank lid and removal of this from its defined position respectively.

FIG. 10 in a diagrammatic partly sectional view shows a modified example of a filling-up pipe 23 of a fuel tank as shown. The filling-up pipe extends in an accommodation 42 in a vehicle body behind a tank flap which is not shown. In this case the sensor 1 of the detector device according to the invention may be mounted in connection to a resilient sealing collar 43 against which the tank lid is intended to seal with its forward edge 44. The tank lid preferably is provided with a locking device known in the art, which locking device with a click sound indicates that a complete tightening of the tank lid has occurred and that a complete sealing thereby has been obtained. Thereby the defined relative position between the tank lid 41 and the opening rim 27 of the filling-up pipe 23 has been obtained and the volume of the cavity in the sensor 1 is limited momentarily whereby the pressure pulse is created and is converted to a detection signal. When the sensor 1 according to FIG. 4 is used the pressure pulse is thus created through pressing down the container 14 into the sensor. When the sensor according to FIG. 6 is used, it is placed in such a way, that it is tilted, when the lid has reached its defined position. When the sensor according to FIG. 7 is used the lever 39 is arranged such, that it is pivoted, when the lid has reached its defined position. The electric detection signal from the detection device according to the invention can partly be used as an indication to the driver that the tank lid is completely screwed on or not and/or is utilized in a self controlling diagnosis system with a leakage search.

The invention is not limited to the design examples described above and shown on the drawings, but can be varied within the scope of subsequent claims. For example it is conceivable that other applications may utilize the detector device according to the invention, where there is required an exact detection of a relative position.

I claim:

1. A device for detecting a defined relative position of a first, movable means relative to a second, fixed means comprising: a sensor including a microphone, said microphone disposed within one of said first or second means, said sensor being adapted to generate an electric signal indicating that said defined relative position has been taken, said sensor having a closed cavity and a cavity compression means for altering a volume of said cavity, said compression means creating a pressure pulse adapted to activate said microphone, said detector device including a converter to convert said pressure pulse to said electric signal for detecting said defined relative position.

2. The device according to claim 1 wherein said converter comprises an amplifier operatively associated with said sensor and a switch operatively associated with said amplifier, said electric signal being output by said electric switch in response to an input electric current pulse output by said microphone in response to said pressure pulse and input to said amplifier.

3. The device according to claim 2 further comprising a current switch for activating said sensor wherein said electric switch is activated by said first movable means being within a given range of said defined relative position.

4. The device according to claim 1 wherein said cavity compression means comprises an airtight, resilient, depressible, closed container, said microphone disposed within said container.

5. The device according to claim 1 wherein said cavity compression means comprises a moveable element disposed within said cavity, said moveable element providing a seal with respect to said cavity such that said cavity volume comprises a subpart of an entire cavity volume said movable element being adapted to move towards said microphone to alter said cavity volume and generate said pressure pulse.

6. The device according to any of preceding claims wherein said sensor is situated in an opening of a filling-up pipe of a fluid container in a motor vehicle and said volume of said cavity is adapted to be momentarily limited by an edge of a closing lid in a correct closing position, said correct closing position comprising said defined relative position.

7. A device for detecting a defined relative position of a first, movable means relative to a second, fixed means comprising: a sensor including a volume and a microphone, said sensor disposed in at least at one of said first or second means, said sensor being adapted to generate an electric signal indicating that said defined relative position has been taken, said sensor being adapted to create a pressure pulse upon said defined relative position being taken, said detection device including a converter to convert said pressure pulse into said electronic signal.

* * * * *